United States Patent
Onggosanusi et al.

(10) Patent No.: US 8,179,810 B2
(45) Date of Patent: May 15, 2012

(54) LOW-COMPLEXITY PRIMARY SYNCHRONIZATION SEQUENCES

(75) Inventors: Eko N. Onggosanusi, Allen, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 952 days.

(21) Appl. No.: 12/112,399

(22) Filed: Apr. 30, 2008

(65) Prior Publication Data

US 2008/0268885 A1 Oct. 30, 2008

Related U.S. Application Data

(60) Provisional application No. 60/914,790, filed on Apr. 30, 2007, provisional application No. 60/939,243, filed on May 21, 2007.

(51) Int. Cl.
*H04L 12/56* (2006.01)
*H04J 1/00* (2006.01)

(52) U.S. Cl. ............... 370/252; 370/210; 370/503

(58) Field of Classification Search ........... 370/252, 370/503, 210
See application file for complete search history.

(56) References Cited

U.S. PATENT DOCUMENTS

| | | |
|---|---|---|
| 5,991,289 A | 11/1999 | Huang et al. |
| 6,768,714 B1 | 7/2004 | Heinonen et al. |
| 7,065,064 B2 | 6/2006 | Chitrapu |
| 7,948,866 B2 * | 5/2011 | Onggosanusi et al. ....... 370/208 |
| 2007/0025457 A1 | 2/2007 | Wang |
| 2008/0235314 A1* | 9/2008 | Lee et al. ...................... 708/426 |

* cited by examiner

*Primary Examiner* — John Pezzlo
(74) *Attorney, Agent, or Firm* — Ronald O. Neerings; Wade James Brady, III; Frederick J. Telecky, Jr.

(57) ABSTRACT

Embodiments of the present disclosure provide a transmitter, a receiver and methods of operating a transmitter and a receiver. In one embodiment, the transmitter is for use with a base station in a in a cellular communication system and includes a scheduling unit configured to provide a primary synchronization signal selected from a group of multiple sequences, wherein at least two of the sequences have complex conjugate symmetry in the time domain. The transmitter also includes a transmit unit configured to transmit the primary synchronization signal. Additionally, the receiver includes a receive unit configured to receive a primary synchronization signal. The receiver also includes a detection unit configured to identify one of a plurality of primary synchronization signals corresponding to a communication cell location of the receiver, wherein at least two of a group of multiple sequences have complex conjugate symmetry in the time domain.

36 Claims, 11 Drawing Sheets

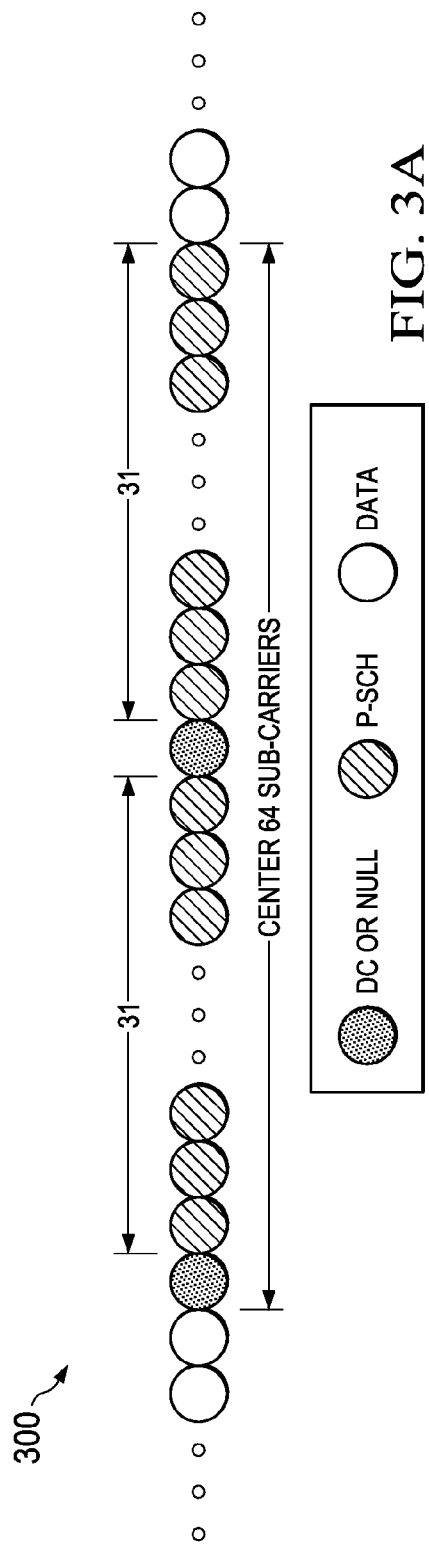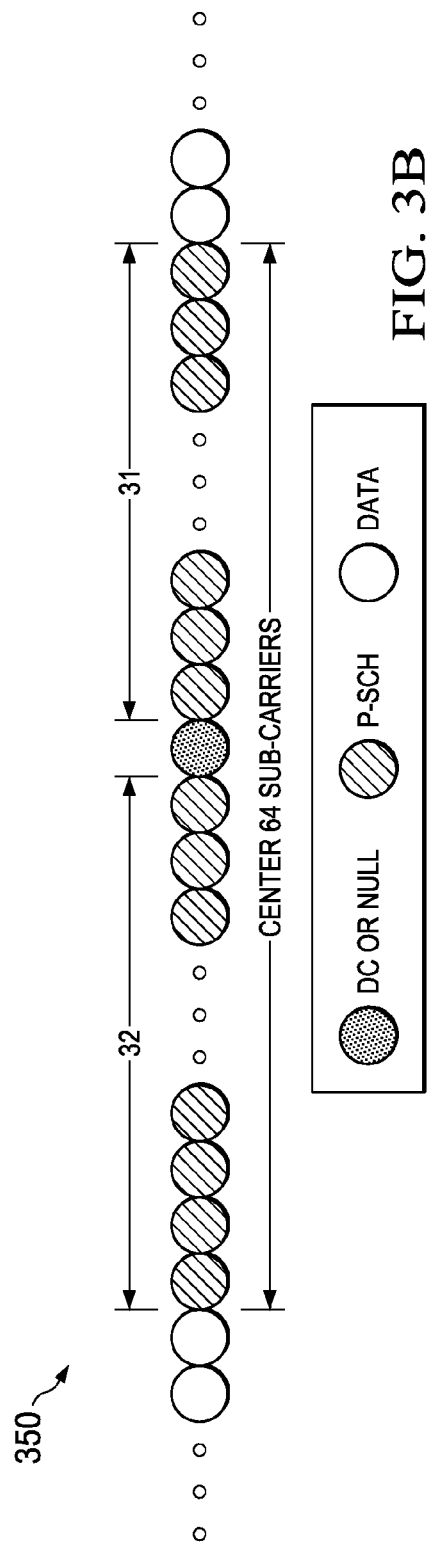

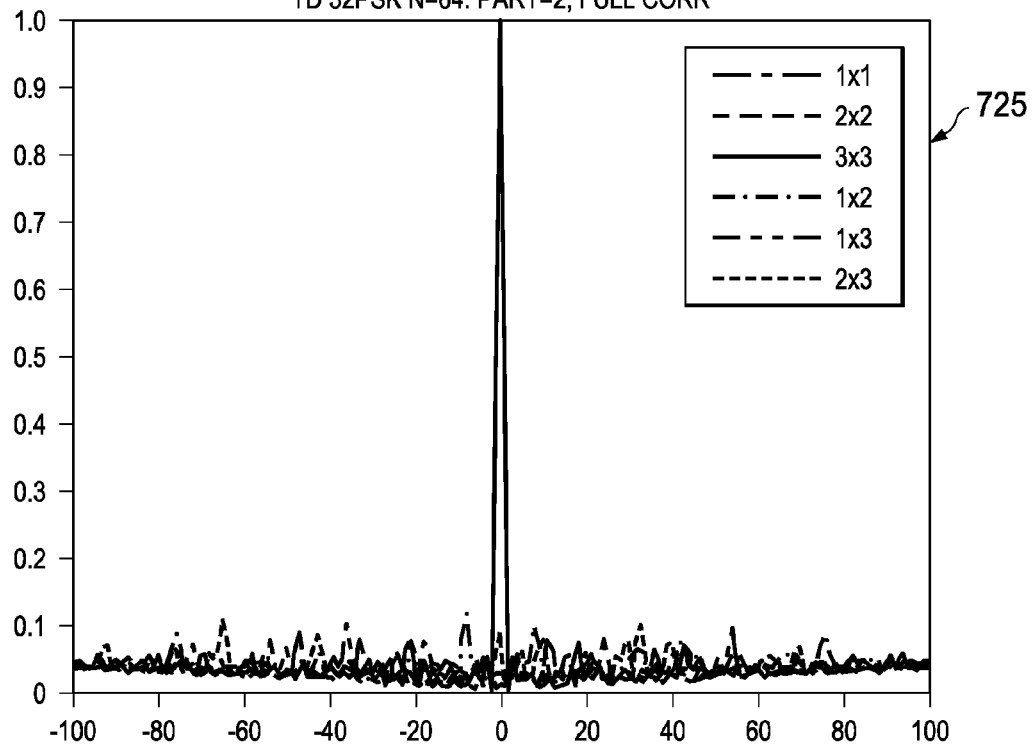
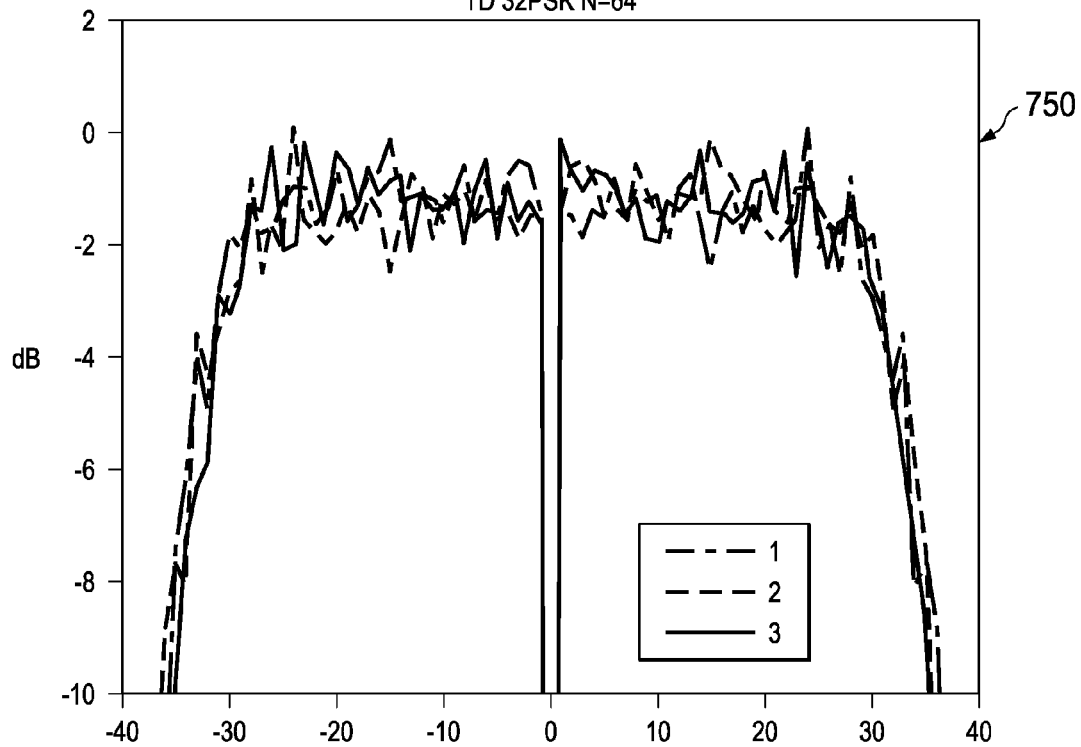

LOW-COMPLEXITY PRIMARY SYNCHRONIZATION SEQUENCES

CROSS-REFERENCE TO PROVISIONAL APPLICATION

This application claims the benefit of U.S. Provisional Application No. 60/914,790 entitled "Design of Low Complexity Primary Synch Code (PSS)" to Eko N. Onggosanusi and Anand G. Dabak filed on Apr. 30, 2007, which is incorporated herein by reference in its entirety.

This application also claims the benefit of U.S. Provisional Application No. 60/939,243 entitled "Design of Low Complexity Primary Synch Code (PSS)" to Eko N. Onggosanusi and Anand G. Dabak filed on May 21, 2007, which is incorporated herein by reference in its entirety.

TECHNICAL FIELD

The present disclosure is directed, in general, to a cellular communication system and, more specifically, to a transmitter and a method of operating a transmitter for use in a base station as well as a receiver and a method of operating a receiver for use in user equipment.

BACKGROUND

In a cellular communications network, such as one employing orthogonal frequency division multiple access (OFDMA), each cell employs a base station that communicates with user equipment, such as a cell phone or a laptop that is actively located within its cell. When the user equipment is first turned on, it has to do an initial cell search in order to be connected to the cellular network. This involves a downlink synchronization process between the base station and the user equipment wherein the base station sends a synchronization signal to the user equipment. The synchronization signal includes a primary synchronization signal, which is used primarily for initial timing and frequency adjustments and channel estimation by the user equipment. Since cellular communications systems offer increasingly greater flexibility in their use, improvements would be beneficial in the art.

SUMMARY

Embodiments of the present disclosure provide a transmitter, a method of operating a transmitter, a receiver and a method of operating a receiver. In one embodiment, the transmitter is for use with a base station in a in a cellular communication system and includes a scheduling unit configured to provide a primary synchronization signal selected from a group of multiple sequences, wherein at least two of the sequences have complex conjugate symmetry in the time domain. The transmitter also includes a transmit unit configured to transmit the primary synchronization signal.

In another embodiment, the receiver is for use with user equipment in a cellular communication system and includes a receive unit configured to receive a primary synchronization signal. The receiver also includes a detection unit configured to identify one of a plurality of primary synchronization signals corresponding to a communication cell location of the receiver, wherein at least two of a group of multiple sequences have complex conjugate symmetry in the time domain.

In another embodiment, the method of operating a transmitter is for use with a base station in a cellular communication system and includes providing a primary synchronization signal selected from a group of multiple sequences, wherein at least two of the sequences have complex conjugate symmetry in the time domain and transmitting the primary synchronization signal.

In yet another embodiment, the method of operating a receiver is for use with user equipment in a cellular communication system and includes receiving a primary synchronization signal and identifying one of a plurality of primary synchronization signals corresponding to a communication cell location of the receiver, wherein at least two of a group of multiple sequences have complex conjugate symmetry in the time domain.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIGS. 3A and 3B illustrate embodiments of primary synchronization signals constructed according to the principles of the present disclosure;

FIGS. 7A, 7B and 7C illustrate correlation profiles a frequency characteristic of the three time domain 32PSK near-CAZAC sequences of length 64, respectively;

DETAILED DESCRIPTION

Embodiments of the present disclosure employ communication cells that provide different primary synchronization sequences instead of a single common primary synchronization sequence. This avoids multi-path combining from adjacent base stations. Since different primary synchronization sequences are used within a first tier cell structure, some network planning may be required. Additionally a received signal needs to be correlated with each of the corresponding primary synchronization signal candidates in user equipment. Therefore, it is desirable that the different primary synchronization signals employ a certain structure that is designed to avoid excessive computational complexity at the user equipment.

Figure 1:
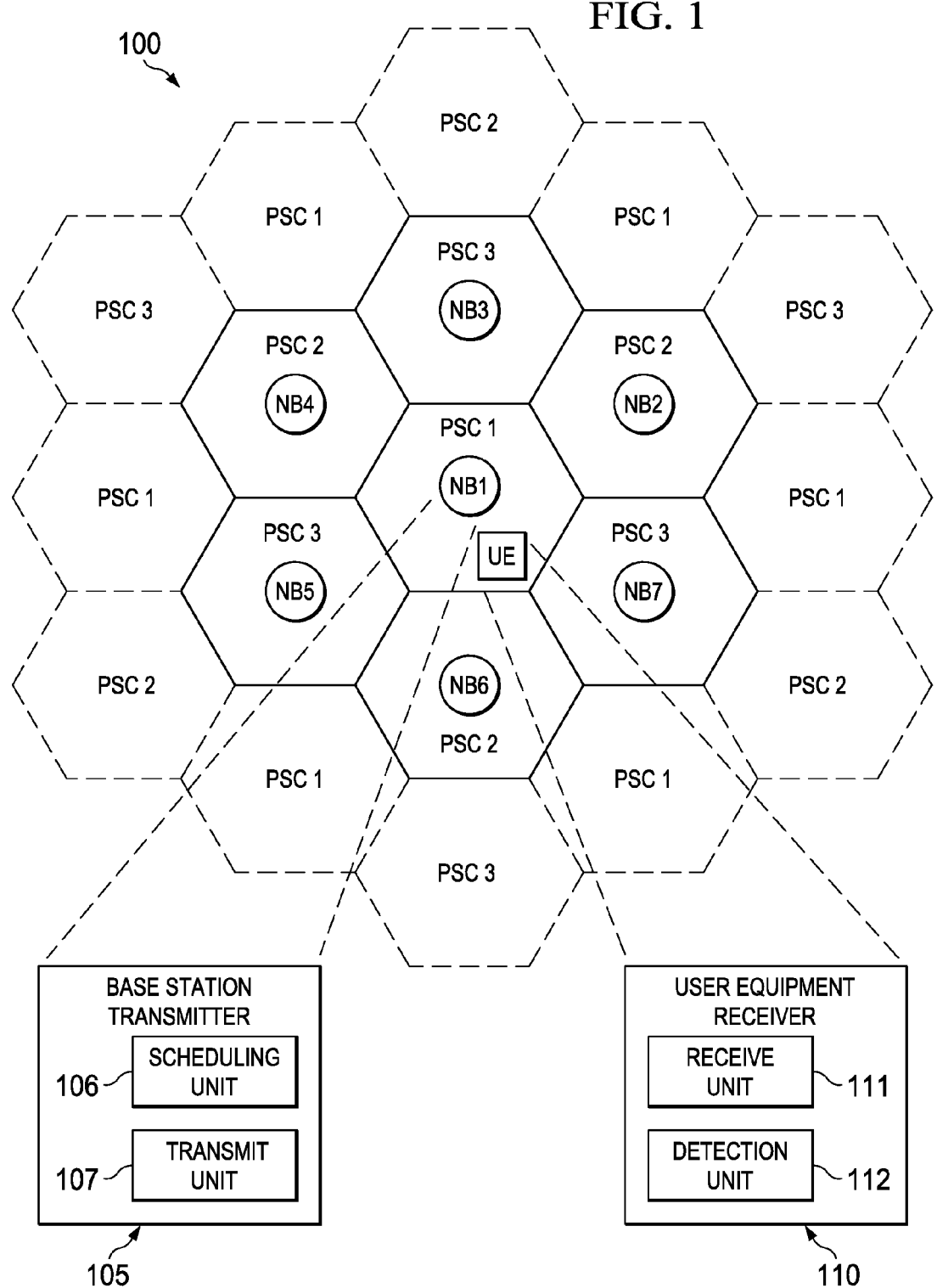
FIG. 1 illustrates a FIG. 1 illustrates a diagram of a cellular communications network as provided by one embodiment of the disclosure.

FIG. 1 illustrates a diagram of a cellular communications network 100 as provided by one embodiment of the disclosure. The cellular network 100 includes a cellular grid having a centric cell and six surrounding first-tier cells. The centric cell employs a centric base station (also called a Node B) NB1 and the surrounding first-tier cells employ first tier Node Bs NB2-NB7, as shown. The cellular network 100 also includes user equipment (UE), which is located in the centric cell. Three different primary synchronization sequences PSS1, PSS2, PSS3 are employed and advantageously arranged in the cellular network 100, as shown.

The centric Node B NB1 includes a base station transmitter 105 having a scheduling unit 106 and a transmit unit 107. In one embodiment, the scheduling unit is configured to provide a primary synchronization signal selected from a group of multiple sequences, wherein at least two of the sequences have complex conjugate symmetry in the time domain. The transmit unit 107 is configured to transmit the primary synchronization signal to the UE. In one embodiment, the group consists of first, second and third sequences and where the third sequence is the complex conjugate of the first or second sequence.

A set of three primary synchronization sequences or codes corresponding to the primary synchronization sequences PSS1, PSS2, PSS3 provide the following properties. Each of the corresponding primary synchronization sequence structures provides an auto-correlation function having a strong peak with relatively small side lobes. A pair wise cross-correlation between two of the primary synchronization sequences is also small in comparison.

The user equipment UE includes a receiver 110 having a receive unit 111 and a detection unit 112. In one embodiment, the receive unit 111 is configured to receive a plurality of primary synchronization signals selected from a group of multiple sequences that are transmitted from base stations located in contiguous communication cells, The detection unit 112 is configured to identify one of the plurality of primary synchronization signals corresponding to a communication cell location of the receiver, wherein at least two of the group of multiple sequences have complex conjugate symmetry in the time domain. In one embodiment, the group consists of first, second and third sequences where the third sequence is the time-domain complex conjugate of the first or second sequence.

When the primary synchronization sequences are designed in the time-domain, the primary synchronization sequence structure provides a reduced computational complexity of the timing acquisition at the UE. Multiplication (real or complex) is reduced as much as possible. Two different approaches are considered in the embodiments below. These include the use of frequency-domain or time-domain sequences.

Figure 2:
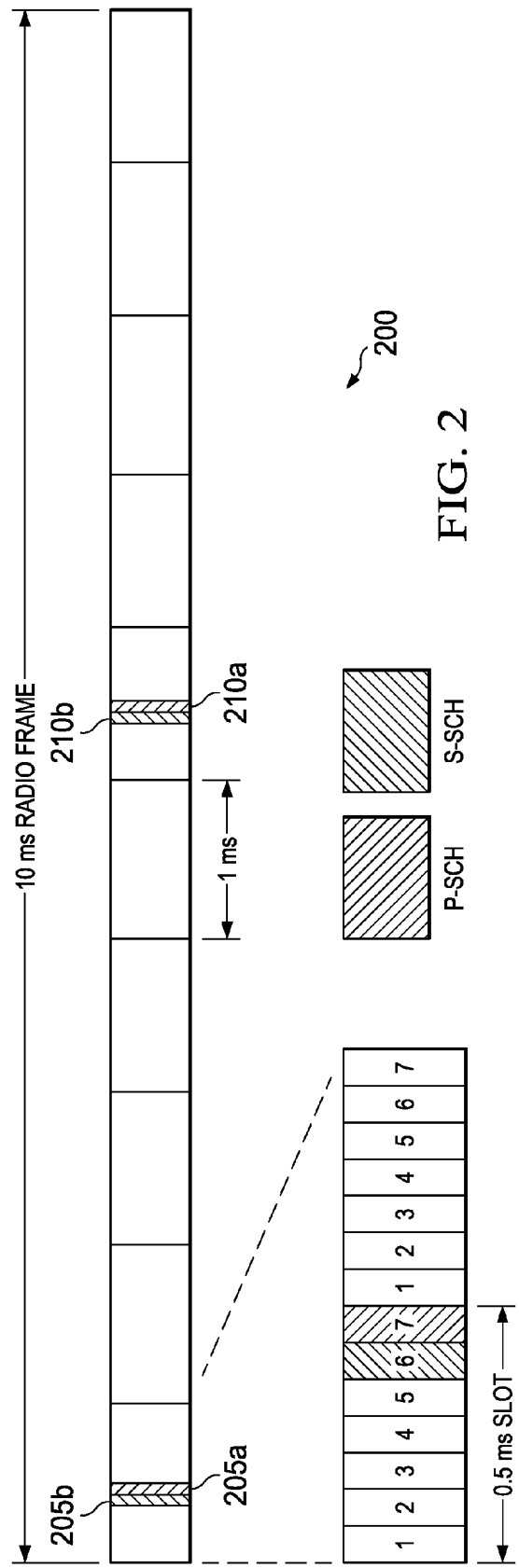
FIG. 2 illustrates a diagram of a downlink radio frame that includes a downlink synchronization signal constructed according to the principles of the present disclosure.

FIG. 2 illustrates a diagram of a downlink radio frame 200 that includes a downlink synchronization signal constructed according to the principles of the present disclosure. The downlink radio frame 200 may be employed in a cellular network, such as the cellular network 100 of FIG. 1, and includes two synchronization signals 205, 210 wherein each consists of a primary synchronization signal (also referred to as P-SCH) 205a or 210a and a secondary synchronization signal (also referred to as S-SCH) 205b or 210b that are located as shown. One P-SCH 205a or 210a and one corresponding S-SCH 205b or 210b symbol are transmitted every 5 ms epoch, as shown. Design of the synchronization signals to enable fast cell search is required for long-term evolution (LTE) of 3GPP.

The underlying code for the P-SCH 205a or 210a is called a primary synchronization sequence (PSS). The PSS for each cell is chosen from three sequences and is tied to the cell identity (ID) within a certain group of cell IDs. Hence, the PSS conveys partial cell ID information and one P-SCH symbol carries three cell ID hypotheses. A total of 504 cell IDs are supported in LTE. Since three cell ID hypotheses are carried in the P-SCH 205 or 210, 168 cell ID groups (168 hypotheses) are provided.

Referring again to FIG. 1 a simple scheme to obtain multiple PSSs that reduces the UE complexity are presented. The proposed schemes are based on the following observations. A persistently exciting complex-valued time-domain sequence X(n) with good auto-correlation property typically has low cross correlation with its complex conjugate $X^*(n)$. The complex conjugate also possesses the same auto-correlation property. This follows from the property of the circular Gaussian process, which is uncorrelated with its complex conjugate.

When the received signal R(n) is correlated with X(n) and its complex conjugate $X^*(n)$, it shares the common summation and multiplication terms. In addition, the terms can be grouped for further complexity reduction. This is evident from equation (1).

$$\sum_{n=0}^{N-1} X^*(n-D)R(n) = \sum_{n=0}^{N-1} [X_r(n-D)R_r(n) + X_i(n-D)R_i(n)] + \tag{1}$$
$$j[X_r(n-D)R_i(n) - X_i(n-D)R_r(n)]$$
$$\sum_{n=0}^{N-1} X(n-D)R(n) = \sum_{n=0}^{N-1} [X_r(n-D)R_r(n) - X_i(n-D)R_i(n)] +$$
$$j[X_r(n-D)R_i(n) + X_i(n-D)R_r(n)]$$

In other words, the correlation between R(n) and $X^*(n)$ can be obtained from the correlation between R(n) and X(n) without computing any additional multiplication terms. Even when sign correlator is used, the components in the summation have certain regularity which can be exploited to reduce the number of additions. Another alternative is to correlate the candidate primary synchronization signals with the phase of the received signal instead of the received signal itself as shown in the equation (2) below:

$$\sum_{n=0}^{N-1} X^*(n-D)\exp(j \times Ph(R(n))) = \tag{2}$$
$$\sum_{n=0}^{N-1} [X_r(n-D)\cos(Ph(R(n))) + X_i(n-D)\sin(Ph(R(n)))] +$$
$$j[X_r(n-D)\sin(Ph(R(n))) - X_i(n-D)\cos(Ph(R(n)))]$$
$$\sum_{n=0}^{N-1} X(n-D)\exp(j \times Ph(R(n))) =$$
$$\sum_{n=0}^{N-1} [X_r(n-D)\cos(Ph(R(n))) - X_i(n-D)\sin(Ph(R(n)))] +$$
$$j[X_r(n-D)\sin(Ph(R(n))) + X_i(n-D)\cos(Ph(R(n)))].$$

Similarly, it is also possible to correlate the phase of the candidate primary synchronization signals with the received signal, or to correlate the phase of the candidate primary synchronization signals with the phase of the received signal.

Based on the above properties, two time-domain signals S1(n) and S2(n) can be generated from one "mother" sequence X(n) using the complex conjugate of the "mother" sequence X*(n). The two signals will have low cross correlation. In addition, correlating the received signal R(n) with the two signals can be performed with a single correlator.

More generally, when a set of M time-domain mother sequences with low pair-wise cross-correlation $\{X_1(n), X_2(n), \ldots, X_M(n)\}$ is available, up to 2M signals with low pair-wise cross-correlation can be obtained from $\{X_1(n), X_1^*(n), X_2(n), X_2^*(n), \ldots, X_M(n), X_M^*(n)\}$. Note that the final time-domain signal is generated by modulating the signals with a certain waveform for spectrum shaping (e.g. Gaussian, square root raised cosine, etc.).

In the context of P-SCH for LTE, three time-domain signals are needed. In that case, the three primary synchronization signals can be obtained from $\{X_1(n), X_1^*(n), X_2(n)\}$ where X1(n) and X2(n) are two distinct time-domain sequences/signals. Some structured construction may be obtained by using well-known sequences. This construction requires complex-valued time-domain sequences. Hence, binary-valued sequences are not applicable.

When odd-length time-domain Zadoff-Chu sequences are used, $S_P(n)=S_{N-P}^*(n)$ where $S_P(n)$ indicates the Zadoff-Chu (ZC) sequence of index P which is defined when N and P are relatively prime:

$$S_P(n) = \exp\left(-j\frac{\pi Pn(n+1)}{N}\right), n=0,1,\ldots,N-1, P=1,2,\ldots,N-1. \quad (3)$$

Therefore, exploiting the complex conjugate property corresponds to using an additional ZC sequence.

For OFDMA system such as LTE, when frequency-domain ZC sequences are used (that is, when the ZC sequence is defined in frequency domain and the time-domain signal is generated by applying inverse DFT/FFT after adding the guard and DC sub-carriers), applying the above complex conjugate property in the time-domain will result in a sequence reversal in the frequency domain. Hence, for a given-frequency-domain ZC sequence $Y_P(k)$, $Y_P^*(N-k)$ can be used to generate two time-domain signals with one being the complex conjugate of another one.

When the sequence length N is odd $Y_P(k)=Y_{N-P}^*(k)$. Hence, the frequency-domain ZC pair $\{Y_P(k), Y_{N-P}(N-k)\}$ will generate two time-domain signals that are the complex conjugate of each other. In the context of LTE, if N is odd, the following three frequency-domain sequences can be used: $\{Y_P(k), Y_{N-P}(N-k), Y_Q(k)\}$ where $S_P(k)$ and $Y_Q(k)$ are two distinct ZC sequences. After the insertion of guard and DC sub-carriers and applying the inverse FFT, this will generate three time-domain signals $\{S_1(n), S_1^*(n), S_2(n)\}$. Otherwise when N is even, the following frequency-domain sequences can be used: $\{Y_P(k), Y_P^*(N-k), Y_Q(k)\}$. Other sequences without any particular symmetric property as the ZC sequence can simply apply the extension scheme in the time-domain.

FIGS. 3A and 3B illustrate embodiments of primary synchronization signals constructed according to the principles of the present disclosure. FIG. 3A shows a mapping in the frequency domain of a primary synchronization signal (P-SCH) 300 that occupies a center 64 sub-carriers for a length 63 sequence, as shown. The mapping includes a DC sub-carrier in the center and a Null sub-carrier on the left side.

The mapping also includes sub-carriers for all of the P-SCH sub-carriers and the data sub-carriers, as shown. This mapping assumes that there are 31 sub-carriers to the left of the DC sub-carrier and 31 sub-carriers to the right of it.

FIG. 3B shows a mapping in the frequency domain of a primary synchronization signal (P-SCH) 350 that occupies a center 64 sub-carriers for a length 64 sequence. The mapping includes a DC sub-carrier in the center. The mapping also includes sub-carriers for all of the P-SCH sub-carriers and the data sub-carriers, as shown. This mapping assumes that there are 32 sub-carriers to the left of the DC sub-carrier and 31 sub-carriers to the right of it.

Referring again to FIG. 1, a set of frequency-domain Zadoff-Chu (FDZC) sequences may be chosen for the primary synchronization signal. It may be noted that the FDZC design is inherently flat in the frequency domain. The three PSSs may be selected based on the following criteria:
1. Robustness against frequency offset;
2. Good correlation properties (autocorrelation and cross-correlation with partitioning 1 and 2); and
3. Potential complexity reduction.

Two different ZC lengths are considered: length N=63 or 64. DC puncturing (i.e., setting the DC value to zero) is always performed.

For N=63, there are 36 available candidates (with M and 63 co-prime) with the following mapping from sequence index n to sub-carrier index k. Here, k=0, 1, ..., 63 indicating the center 64 sub-carriers with DC at k=32:

$$S_M^{(63)}(n) = \exp\left(-j\frac{\pi Mn(n+1)}{63}\right), n=0,1,\ldots,62 \quad (4)$$

$$X(k) = \begin{cases} S_M^{(63)}(k-1), & 1 \le k \le 31 \\ 0, & k=0,32 \\ S_M^{(63)}(k-1), & 33 \le k \le 63 \end{cases}$$

Hence, the sequence occupies only 62 sub-carriers excluding the DC and the leftmost sub-carrier within the center 64 sub-carriers.

For N=64, there are 32 available candidates (with M and 64 co-prime—M odd) with the following mapping from sequence index n to sub-carrier index k:

$$S_M^{(64)}(n) = \exp\left(-j\frac{\pi Mn^2}{64}\right), n=0,1,\ldots,63 \quad (5)$$

$$X(k) = \begin{cases} S_M^{(64)}(k), & 0 \le k \le 31 \\ 0, & k=32 \\ S_M^{(64)}(k), & 33 \le k \le 63 \end{cases}$$

For ZC-based design, the frequency offset sensitivity, which comes from the chirp-like property of ZC sequences, needs to be taken into account. This sensitivity can be easily illustrated by the following equation (assuming a length-N ZC sequence where N is even and M is relatively prime to N)

$$S_M(n-D) = \exp\left(-j\frac{\pi M(n-D)^2}{N}\right) = \quad (6)$$

$$\exp\left(j\frac{2\pi MDn}{N}\right)\exp\left(-j\frac{\pi Mn^2}{N}\right)e^{j\phi} = \exp\left(j\frac{2\pi MDn}{N}\right)S_M(k)e^{j\phi}$$

Notice that the first term in equation (5) generates a frequency offset effect. Consequently, it is impossible to distinguish a timing offset from a frequency offset. That is, a large enough frequency offset is mistaken as a timing error (manifested in terms of a peak shift in the auto-correlation profile). Conversely, a timing error/offset can be mistaken as a frequency offset.

For initial cell search, the initial frequency offset depends on the type of crystal that is used for the UE. More economical crystals (e.g. DCXO) result in very high initial offset (±10 to 20 ppm). A lower offset such as ±5 ppm is possible with more expensive crystals such as VCTCXO. Assuming the more expensive crystals, it is important that the primary synchronization signal be designed to operate well with ±5 ppm frequency offset.

Figure 4:
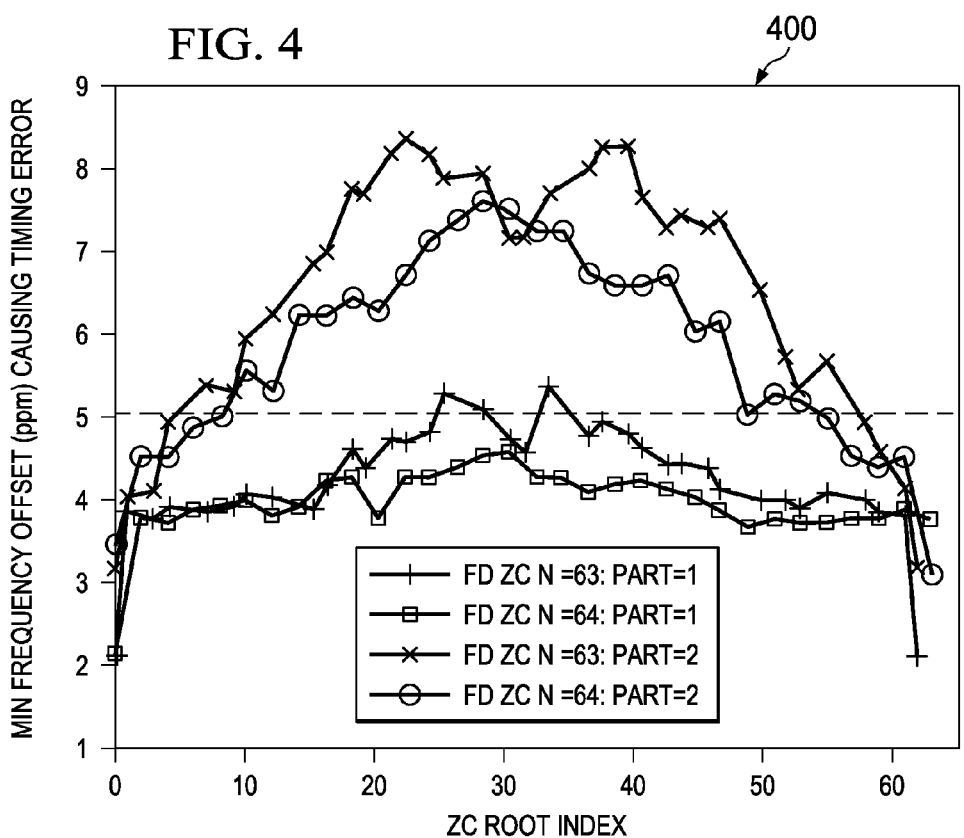
FIG. 4 illustrates a chart of frequency offset sensitivity of the frequency domain Zadoff-Chu (FDZC) sequence candidates of length 63 and 64.
Figure 5A:
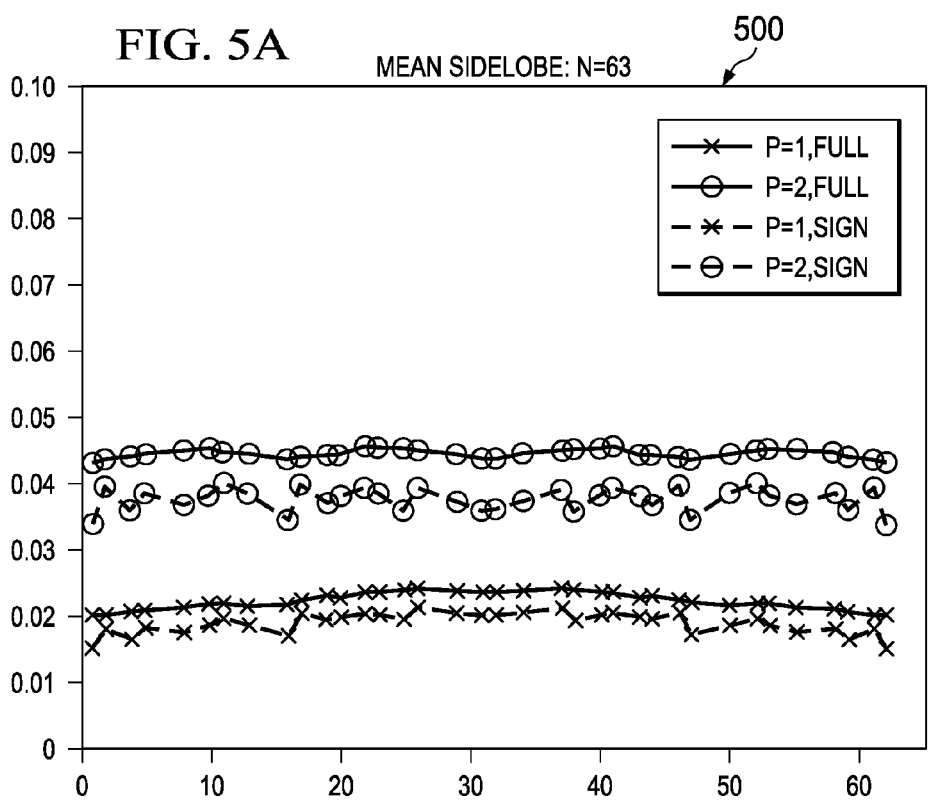
FIGS. 5A, 5B, 5C, and 5D illustrate one-part and two-part correlation profiles for the FDZC sequence candidates of length 63 and 64.
Figure 5B:
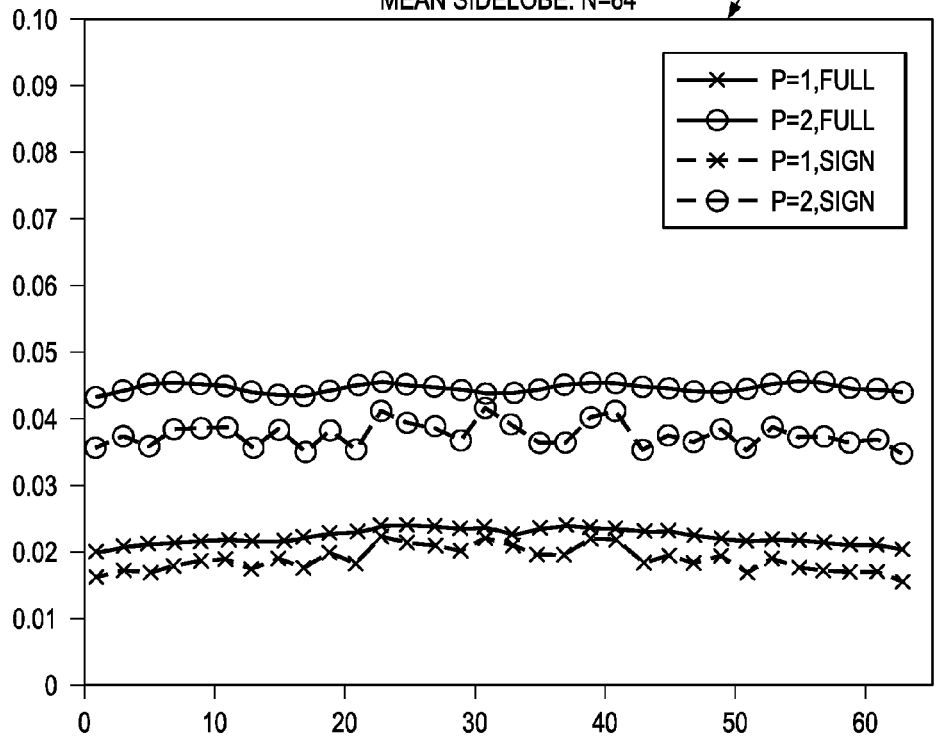
Figure 5C:
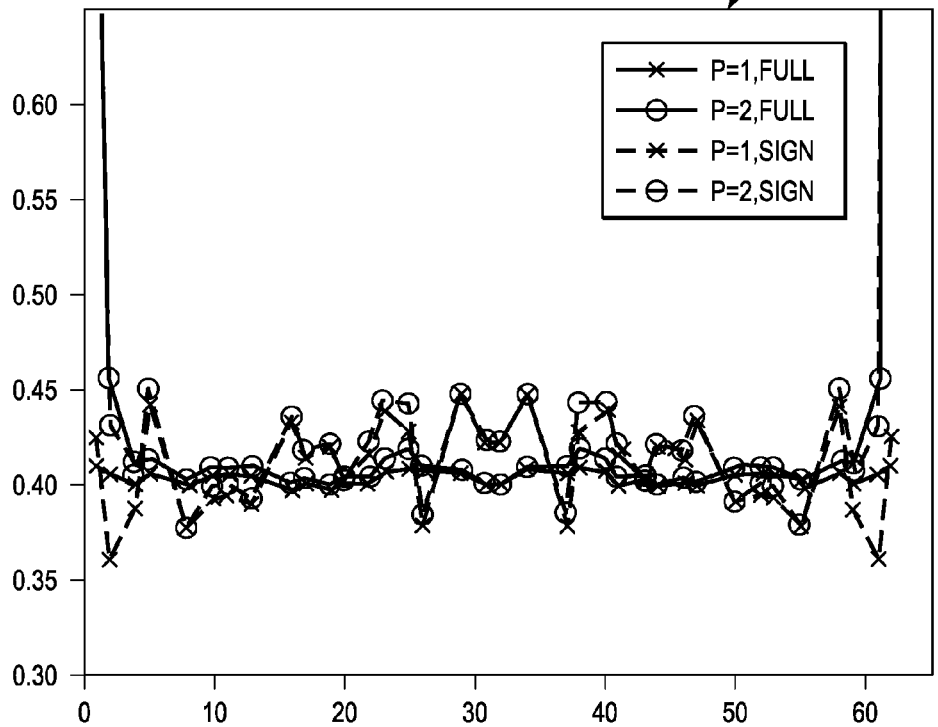
Figure 5D:
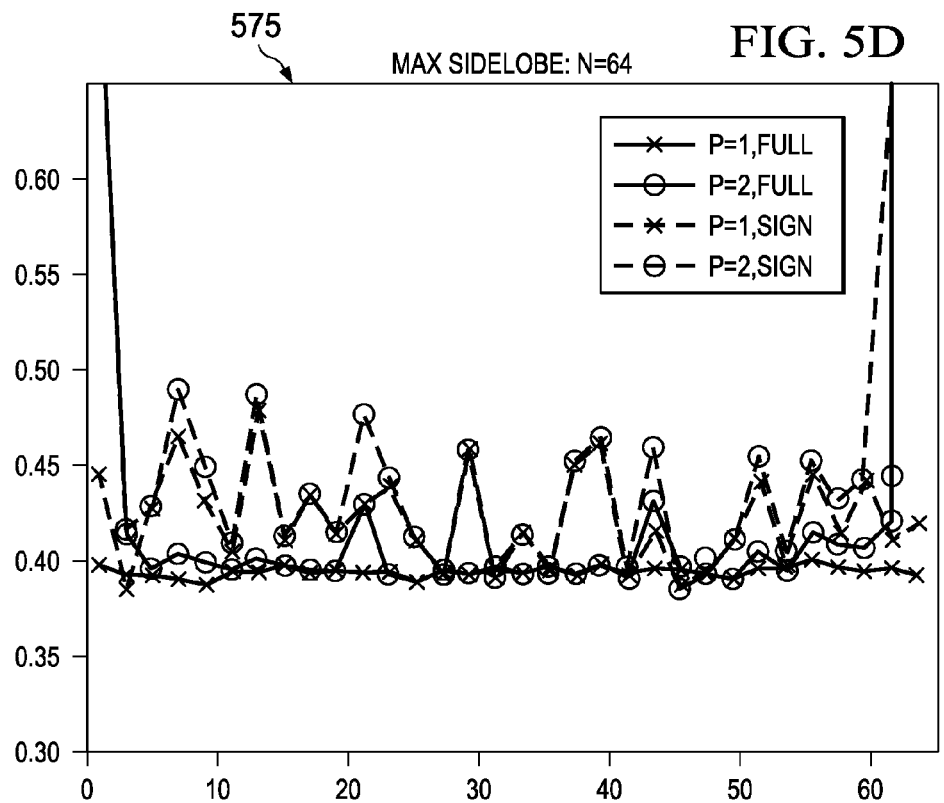
Figure 6A:
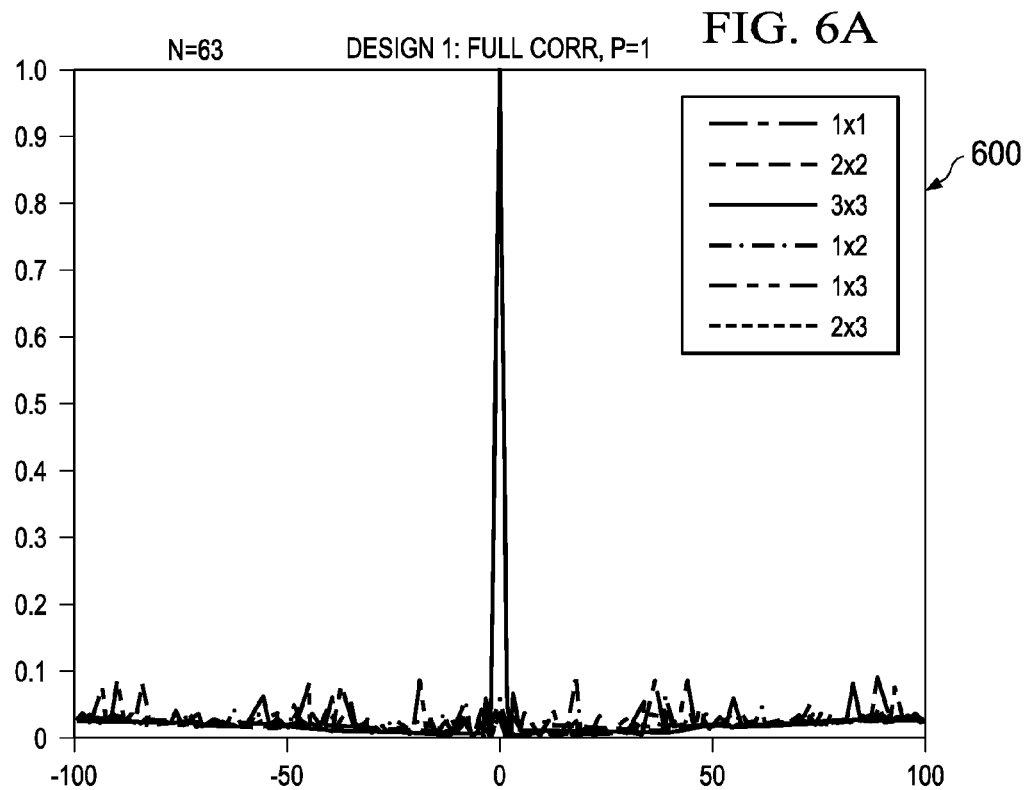
FIGS. 6A, 6B, 6C, 6D, 6E, and 6F illustrate one-part and two-part correlation profiles for the FDZC sequence candidates of length 63 and 64.
Figure 6B:
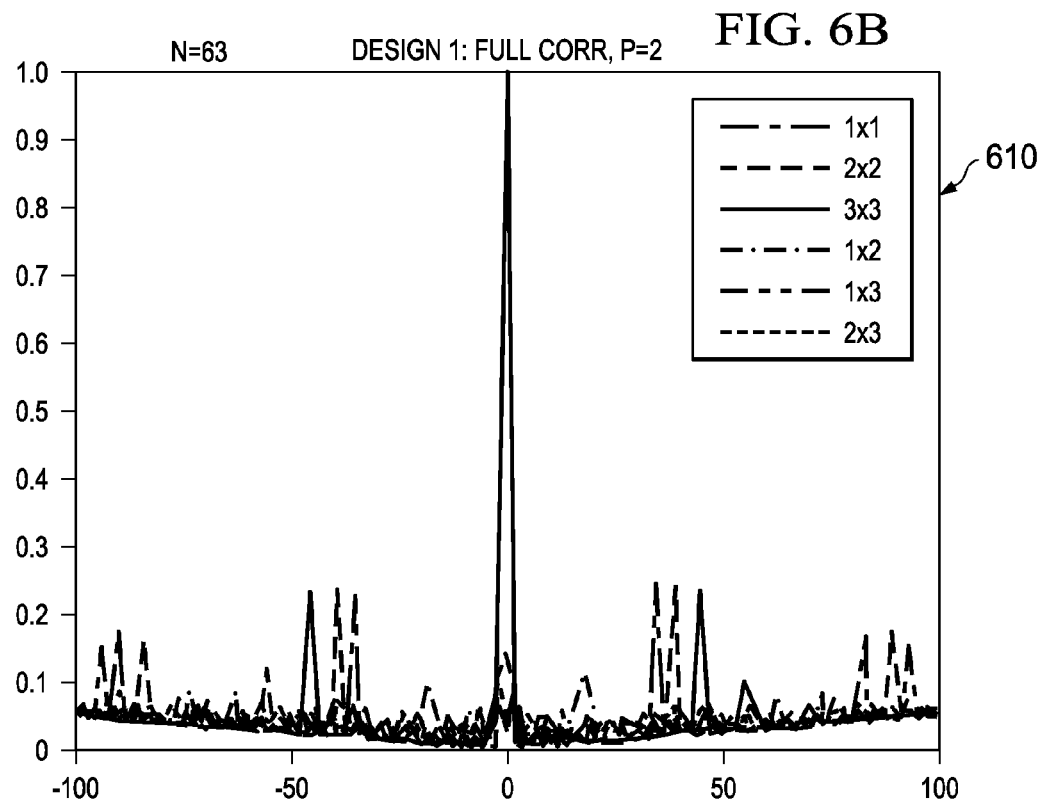
Figure 6C:
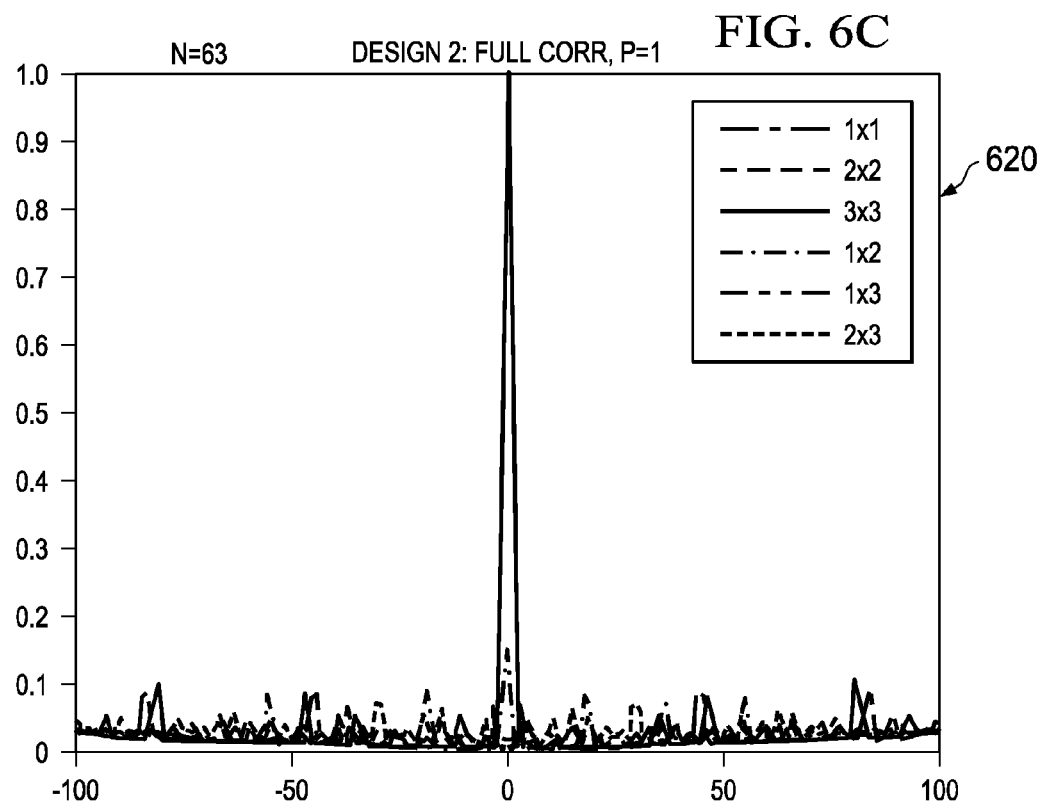
Figure 6D:
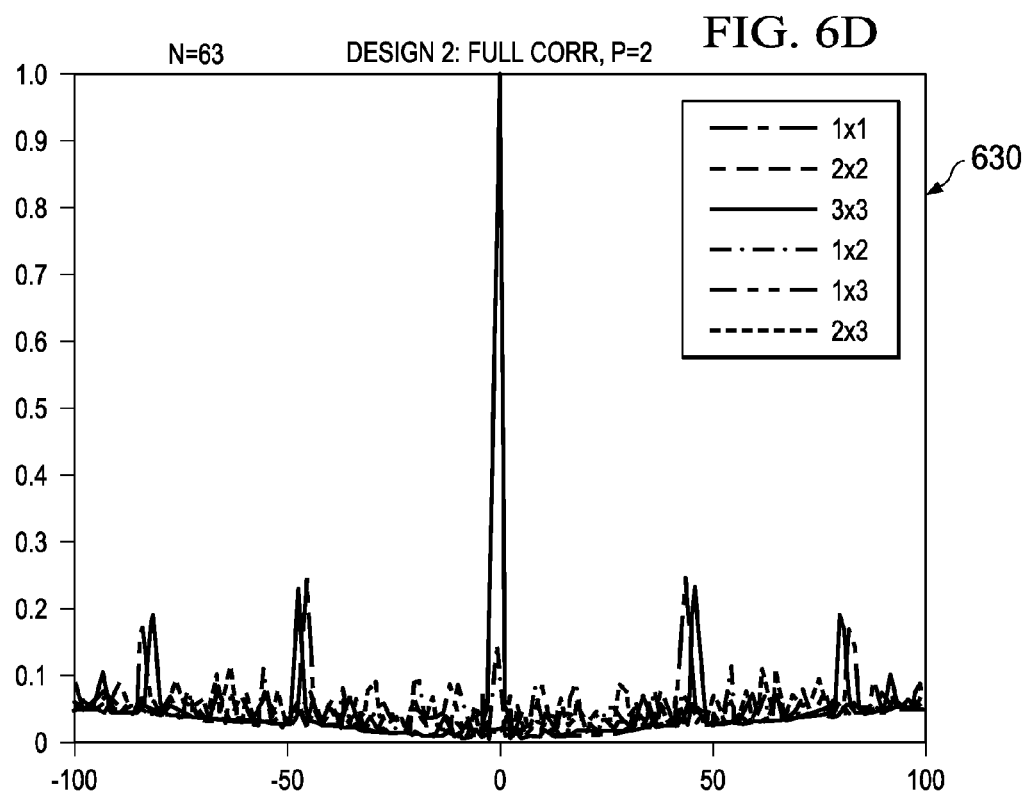
Figure 6E:
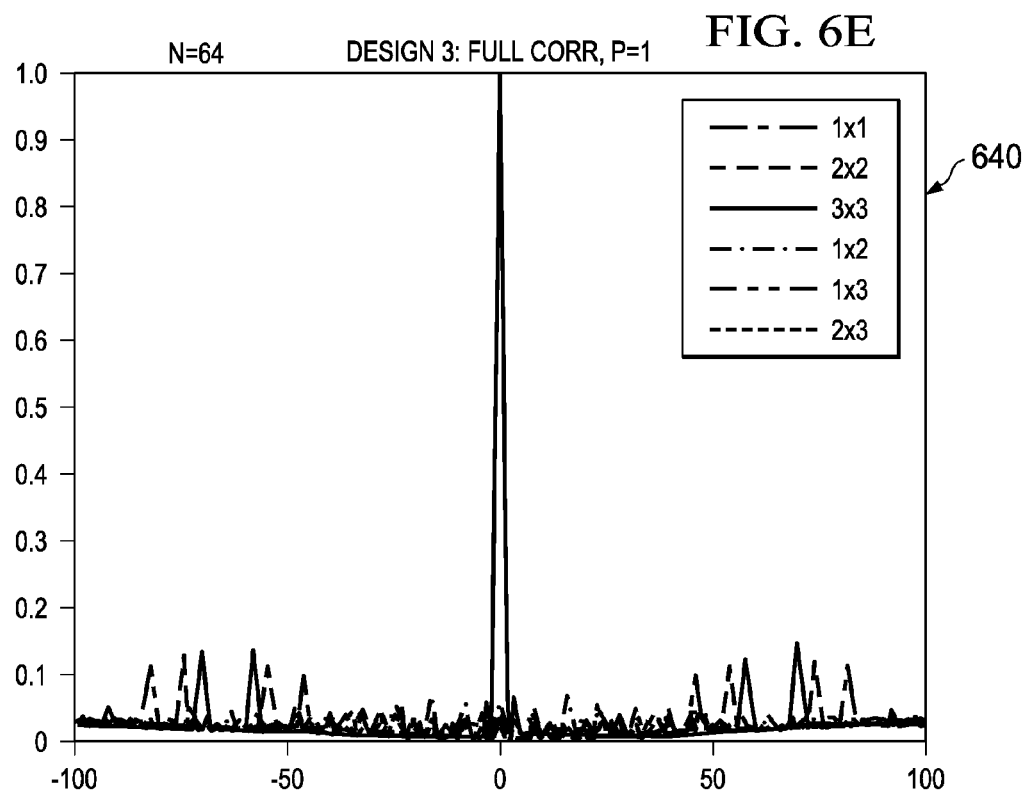
Figure 6F:
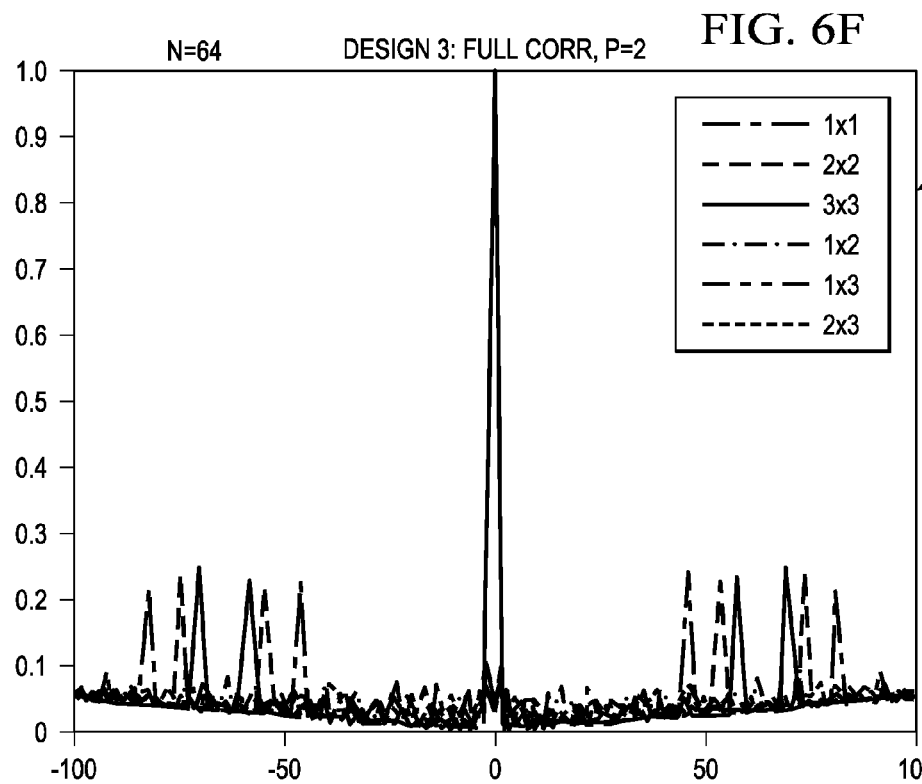

FIG. 4 illustrates a chart of frequency offset sensitivity of the frequency domain Zadoff-Chu (FDZC) sequence candidates of length 63 and 64. The y-axis indicates the minimum frequency offset, which is mistaken as a timing offset (shift in the peak of the auto-correlation profiles). The results for one-part and two-part correlations are given. The results indicate that at least three ZC sequences may be chosen to avoid performance degradation for a frequency offset of ±5 ppm when a two-part correlation is used. Note that the worst root sequence corresponds to M=1 (and therefore M=N−1). Based on the results in FIG. 4, only the candidates with frequency offset sensitivity better than ±5 ppm are considered below.

Returning to FIG. 1, the next selection step is to remove the candidates with inferior auto-correlation profiles. The squared aperiodic autocorrelation and cross-correlation functions are defined as follows (based on the length-128 time-domain replica), assuming unit-energy per sample:

$$C_{n,m}(D) = \left| \sum_{k=0}^{N-1} S_n^*(k-D) S_m(k) \right|^2 + |D| \quad (7)$$

Notice that the correlation function above assumes no partitioning and full correlation with the sequence. In addition to the above auto-correlation, a two-part correlation function is considered as well as sign correlation. That is, the received signal is correlated with the quantized version of the PSSs where the quantized replicas take values from $\{+1,-1,+j,-j\}$. This results in the same complexity as that of binary-based sequences.

FIGS. 5A, 5B, 5C, and 5D illustrate one-part and two-part correlation profiles for the FDZC sequence candidates of length 63 and 64. The mean and maximum sidelobes are computed in the auto-correlation profiles. Since all of the candidates have approximately the same mean side lobe, maximum sidelobe is used for further selection.

Returning to FIG. 1, further selection is performed by minimizing the cross-correlation among the three PSSs. Again, both one-part and two-part correlations as well as full and sign correlations are considered. For N=63, two constructions are considered:
1. Select three root ZC sequences {M1,M2,M3} to construct the PSS triplet with no particular constraint; and
2. Select three root ZC sequences {M1,M2,M3} to construct the PSS triplet, where M3=N−M2.

For the third PSS, the resulting time-domain waveform is a complex conjugate of the second PSS. This allows approximately a 33 percent complexity reduction compared to the first construction. This results because the correlation between the received signal and the third PSS can be obtained from the correlation with the second PSS.

This final optimization procedure results in the combinations given in Table 1. The cubic metrics are also given for comparison.

TABLE 1

FDZC construction

| Design | N | Constraint | Root Sequences | Cubic Metric (dB) |
|---|---|---|---|---|
| 1 | 63 | Free Choice of M1, M2, M3 | [19 22 46] | 1.85, 1.86, 2.76 |
| 2 | 63 | M3 = N − M2 | [41 23 40] | 1.86, 1.70, 1.70 |
| 3 | 64 | Free Choice of M1, M2, M3 | [23 27 29] | 2.61, 1.97, 1.69 |

Note that the second design (Design 2) results in the lowest computational complexity as well as the lowest average cubic metric. While the above combinations are optimal given the procedure mentioned above, other combinations can also be obtained if a different optimization procedure is used.

FIGS. 6A, 6B, 6C, 6D, 6E, and 6F illustrate one-part and two-part correlation profiles for the FDZC sequence candidates of length 63 and 64. The correlation profiles for the three designs (Table 1) are shown. Observe that Design 3 (N=64) results in slightly worse correlation profiles compared to Designs 1 and 2 (N=63). In general, all the candidates have good correlation profiles.

Returning to FIG. 1, to ensure satisfactory performance for the non-repetitive P-SCH in all scenarios (e.g., initial and non-initial cell search, different channel or deployment conditions, UE crystal characteristics), sequences with near-CAZAC properties that do not exhibit chirp-like property may be used. Analogous to the time domain ZC design, this alternative time-domain P-SCH design can be constructed from the following three time domain sequences of length 64 (Table 1 provides the phase of the sequences).

$$S_1(k) = \exp\left(j \frac{\pi \theta_1(k)}{32}\right) \quad (8)$$

$$S_2(k) = S_1^*(k)$$

$$S_3(k) = \exp\left(j \frac{\pi \theta_2(k)}{32}\right)$$

TABLE 1

| | Phase Index for 32-PSK sequences |
|---|---|
| $\theta_1(k)$ | [ 10, −13, 21, −10, 9, 1, 18, 20, −27, −23, −12, −11, 28, −26, 17, 1, −28, −11, 9, 17, 8, 9, 30, −16, 17, 29, 9, −10, 19, 30, 3, −10, 30, 23, −22, −11, 11, 28, 7, 12, −4, 11, −14, −3, −16, −24, 20, 6, 28, 4, −24, −32, 30, −26, 12, 25, −25, 25, −11, 30, 27, −30, −20, −31 ] |
| $\theta_2(k)$ | [ −28, 5, 1, −10, 22, 26, 17, −32, −7, 6, 28, −28, −7, −10, 7, −24, 19, −16, 29, 11, 6, −27, 16, 21, −31, −9, 31, 22, 28, 19, 15, 1, −2, 19, 4, 17, 26, 0, 24, −12, −29, 20, −31, 17, 27, 32, −4, 0, −21, −26, 8, −12, −22, −20, −8, 9, −13, 2, −30, 17, 30, −22, 30, 4 ] |

Notice that the above sequences are 32-PSK valued. Also, the second sequence is generated from the complex conjugate of the first sequence. This enables the complexity reduction described above, which is analogous to the time domain ZC design. Similar to the time domain ZC design, the primary synchronization signal is constructed by performing DC puncturing (subtract the mean from the sequence) and modulating the resulting sequence with a waveform such as the SRRC waveform.

Figure 7A:
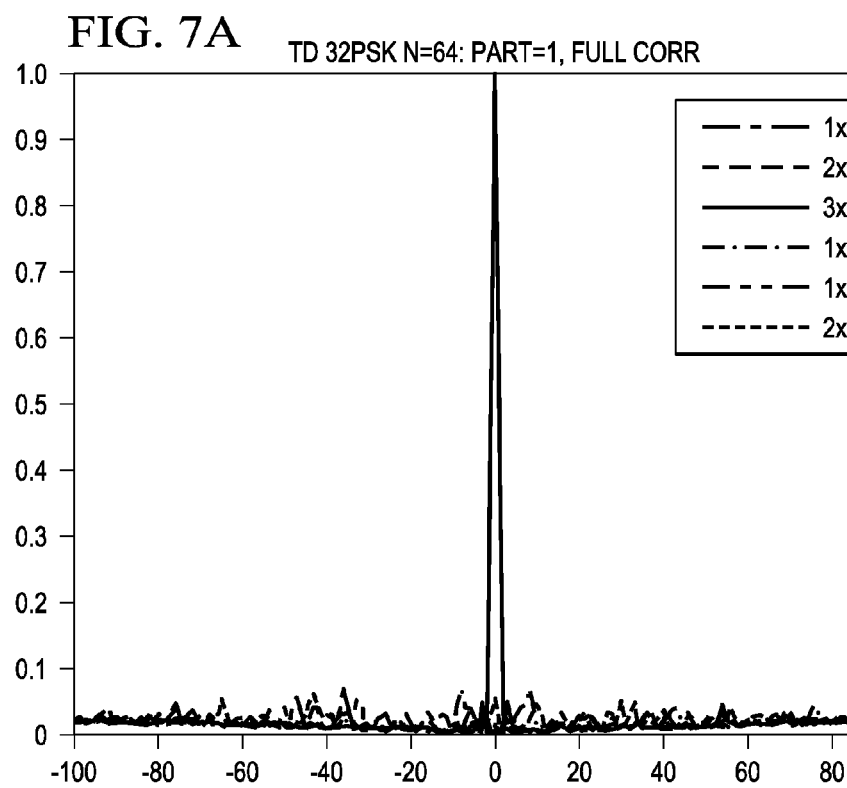

FIGS. 7A, 7B and 7C illustrate correlation profiles a frequency characteristic of the three time domain 32PSK near-CAZAC sequences of length 64, respectively. Observe that the correlation profiles are better than those for the ZC-based designs. The pass band ripple in the frequency characteristics is ~1.5-2 dB (i.e., 0.5-1 dB higher than that for the time domain ZC design). This does not affect the performance of coherent secondary synchronization code detection. Note that typical time-domain binary designs result in an approximate 8 dB to 9 dB ripple in frequency domain.

Figure 8:
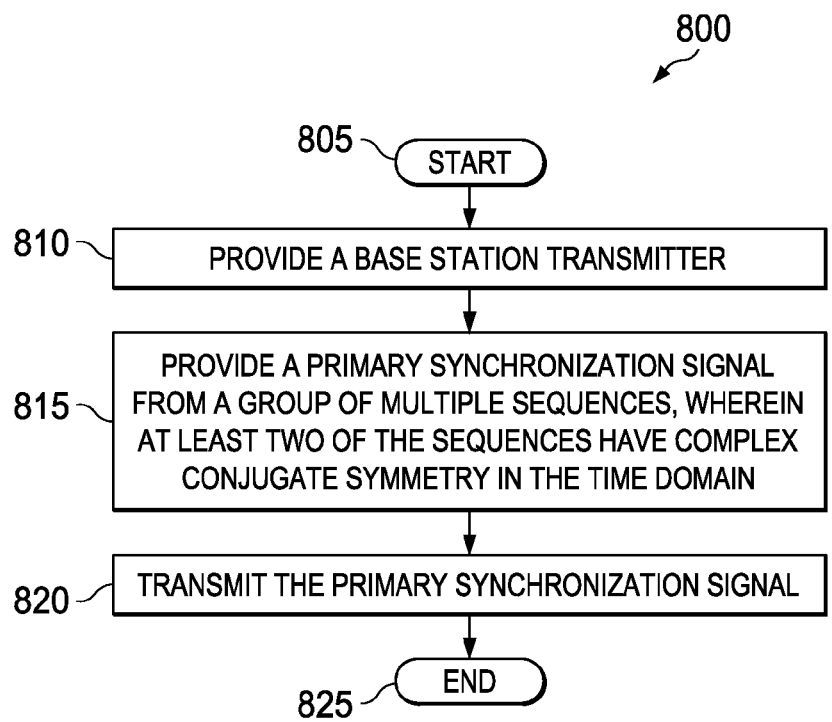
FIG. 8 illustrates a flow diagram of an embodiment of a method of operating a transmitter 800 carried out according to the principles of present disclosure.

FIG. 8 illustrates a flow diagram of an embodiment of a method of operating a transmitter 800 carried out according to the principles of present disclosure. The method 800 is for use with a base station in a cellular communication system and starts in a step 805. A base station transmitter is provided in a step 810. Then, in a step 815, a primary synchronization signal selected from a group of multiple sequences is provided, wherein at least two of the sequences have complex conjugate symmetry in the time domain.

In one embodiment, the group is selected from a set of time domain Zadoff-Chu sequences. Additionally, the group consists of first, second and third sequences and where the third sequence is the time-domain complex conjugate of the first or second sequence.

In one embodiment, the group is selected from a set of frequency domain Zadoff-Chu sequences of length 63. Additionally, the group corresponds to sequences having root indices of n1, n2 that is different from n1 and 63-n1 where n1 and n2 take values between 1 and 63.

In one embodiment, the group is selected from a set of frequency domain Zadoff-Chu sequences of length 64. In another embodiment, the group is selected from a time domain near-CAZAC sequence of length 64. Additionally, the group corresponds to sequences provided in a 32 phase shift key (32PSK) format. The primary synchronization signal is transmitted in a step 820. The method 800 ends in a step 825.

Figure 9:
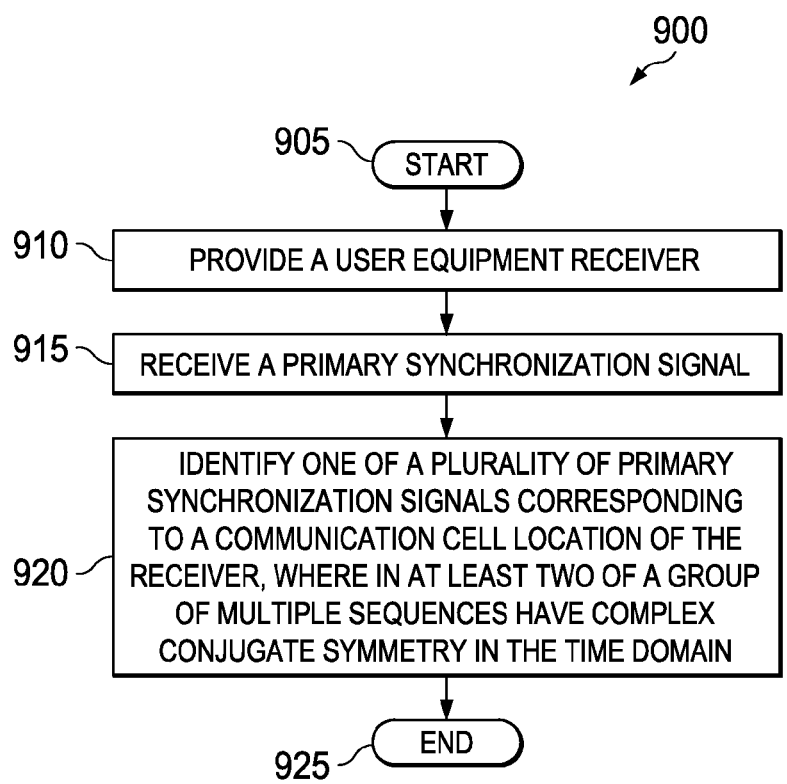
FIG. 9 illustrates a flow diagram of an embodiment of a method of operating a receiver 900 carried out according to the principles of present disclosure.

FIG. 9 illustrates a flow diagram of an embodiment of a method of operating a receiver 900 carried out according to the principles of present disclosure. The method 900 is for use with user equipment in a cellular communication system and starts in a step 905. A user equipment receiver is provided in a step 910, and a primary synchronization signal is received in a step 915. Then, in a step 920, one of a plurality of primary synchronization signals is identified corresponding to a communication cell location of the receiver, wherein at least two of a group of multiple sequences have complex conjugate symmetry in the time domain.

In one embodiment, the group is selected from a set of time domain Zadoff-Chu sequences. Additionally, the group consists of first, second and third sequences and where the third sequence is the time-domain complex conjugate of the first or second sequence.

In one embodiment, the group consists of first, second and third sequences and where the third sequence is the time-domain complex conjugate of the first or second sequence. Additionally, a primary synchronization signal is detected that includes correlating a received signal with a replica of each of at least two possible primary synchronization signals. Alternatively, a primary synchronization signal is detected that includes correlating a phase of a received signal with a replica of each of at least two possible primary synchronization signals.

In one embodiment, the group is selected from a set of frequency domain Zadoff-Chu sequences of length 63. Additionally, the group corresponds to sequences having root indices of n1, n2 that is different from n1 and 63-n1 where n1 and n2 take values between 1 and 63. Alternatively, the group is selected from a set of frequency domain Zadoff-Chu sequences of length 64.

In one embodiment, the group contains a complex conjugate sequence and is selected from a time domain near-CAZAC sequence of length 64. Additionally, the group corresponds to sequences provided in a 32 phase shift key (32PSK) format. The method 900 ends in a step 925.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

In summary, embodiments of the present disclosure have been presented including a base station transmitter, a user equipment receiver and methods of operating a base station transmitter and a user equipment receiver. Embodiments for three primary synchronization sequences based on time domain Zadoff-Chu, frequency domain Zadoff-Chu and time domain near-CAZAC sequences were discussed. In one embodiment, it was found that the FDZC design based on N=63 may be preferred in terms of performance and complexity. The third sequence is chosen such that the resulting time-domain signal is the complex conjugate of one of the other two sequences. This results in significant complexity saving while attaining good performance for user equipment.

Those skilled in the art to which the disclosure relates will appreciate that other and further additions, deletions, substitutions and modifications may be made to the described example embodiments without departing from the the disclosure.

What is claimed is:

1. A transmitter for use with a base station in a cellular communication system, comprising:
   a scheduling unit configured to provide a primary synchronization signal selected from a group of multiple sequences, wherein at least two of the sequences have complex conjugate symmetry in the time domain; and
   a transmit unit configured to transmit the primary synchronization signal.

2. The transmitter as recited in claim 1 wherein the group consists of first, second and third sequences and where the third sequence is the time-domain complex conjugate of the first or second sequence.

3. The transmitter as recited in claim 1 wherein the group is selected from a set of frequency domain Zadoff-Chu sequences of length 63.

4. The transmitter as recited in claim 3 wherein the group corresponds to sequences having root indices of n1, n2 that is different from n1 and 63-n1 where n1 and n2 take values between 1 and 63.

5. The transmitter as recited in claim 1 wherein the group is selected from a set of time domain Zadoff-Chu sequences.

6. The transmitter as recited in claim 1 wherein the group is selected from a set of frequency domain Zadoff-Chu sequences of length 64.

7. The transmitter as recited in claim 1 wherein the group is selected from a time domain near-CAZAC sequence of length 64.

8. The transmitter as recited in claim 7 wherein the group corresponds to sequences provided in a 32 phase shift key (32PSK) format.

9. A method of operating a transmitter for use with a base station in a cellular communication system, comprising:
   providing a primary synchronization signal selected from a group of multiple sequences, wherein at least two of the sequences have complex conjugate symmetry in the time domain; and
   transmitting the primary synchronization signal.

10. The method as recited in claim 9 wherein the group consists of first, second and third sequences and where the third sequence is the time-domain complex conjugate of the first or second sequence.

11. The method as recited in claim 9 wherein the group is selected from a set of frequency domain Zadoff-Chu sequences of length 63.

12. The method as recited in claim 11 wherein the group corresponds to sequences having root indices of n1, n2 that is different from n1 and 63-n1 where n1 and n2 take values between 1 and 63.

13. The method as recited in claim 9 wherein the group is selected from a set of time domain Zadoff-Chu sequences.

14. The method as recited in claim 9 wherein the group is selected from a set of frequency domain Zadoff-Chu sequences of length 64.

15. The method as recited in claim 9 wherein the group is selected from a time domain near-CAZAC sequence of length 64.

16. The method as recited in claim 15 wherein the group corresponds to sequences provided in a 32 phase shift key (32PSK) format.

17. A receiver for use with user equipment in a cellular communication system, comprising:
   a receive unit configured to receive a primary synchronization signal; and
   a detection unit configured to identify one of a plurality of primary synchronization signals corresponding to a communication cell location of the receiver, wherein at least two of a group of multiple sequences have complex conjugate symmetry in the time domain.

18. The receiver as recited in claim 17 wherein the group consists of first, second and third sequences and where the third sequence is the time-domain complex conjugate of the first or second sequence.

19. The receiver as recited in claim 18 wherein detecting a primary synchronization signal includes correlating a received signal with a replica of each of at least two possible primary synchronization signals.

20. The receiver as recited in claim 18 wherein detecting a primary synchronization signal includes correlating a phase of a received signal with a replica of each of at least two possible primary synchronization signals.

21. The receiver as recited in claim 17 wherein the group is selected from a set of frequency domain Zadoff-Chu sequences of length 63.

22. The receiver as recited in claim 21 wherein the group corresponds to sequences having root indices of n1, n2 that is different from n1 and 63-n1 where n1 and n2 take values between 1 and 63.

23. The receiver as recited in claim 17 wherein the group is selected from a set of time domain Zadoff-Chu sequences.

24. The receiver as recited in claim 17 wherein the group is selected from a set of frequency domain Zadoff-Chu sequences of length 64.

25. The receiver as recited in claim 17 wherein the group contains a complex conjugate sequence and is selected from a time domain near-CAZAC sequence of length 64.

26. The receiver as recited in claim 25 wherein the group corresponds to sequences provided in a 32 phase shift key (32PSK) format.

27. A method of operating a receiver for use with user equipment in a cellular communication system, comprising:
   receiving a primary synchronization signal; and
   identifying one of a plurality of primary synchronization signals corresponding to a communication cell location of the receiver, wherein at least two of a group of multiple sequences have complex conjugate symmetry in the time domain.

28. The method as recited in claim 27 wherein the group consists of first, second and third sequences and where the third sequence is the time-domain complex conjugate of the first or second sequence.

29. The method as recited in claim 28 wherein detecting a primary synchronization signal includes correlating a received signal with a replica of each of at least two possible primary synchronization signals.

30. The method as recited in claim 28 wherein detecting a primary synchronization signal includes correlating a phase of a received signal with a replica of each of at least two possible primary synchronization signals.

31. The method as recited in claim 27 wherein the group is selected from a set of frequency domain Zadoff-Chu sequences of length 63.

32. The method as recited in claim 31 wherein the group corresponds to sequences having root indices of n1, n2 that is different from n1 and 63-n1 where n1 and n2 take values between 1 and 63.

33. The method as recited in claim 27 wherein the group is selected from a set of time domain Zadoff-Chu sequences.

34. The method as recited in claim 27 wherein the group is selected from a set of frequency domain Zadoff-Chu sequences of length 64.

35. The method as recited in claim 27 wherein the group contains a complex conjugate sequence and is selected from a time domain near-CAZAC sequence of length 64.

36. The method as recited in claim 35 wherein the group corresponds to sequences provided in a 32 phase shift key (32PSK) format.

* * * * *